Figure 1:
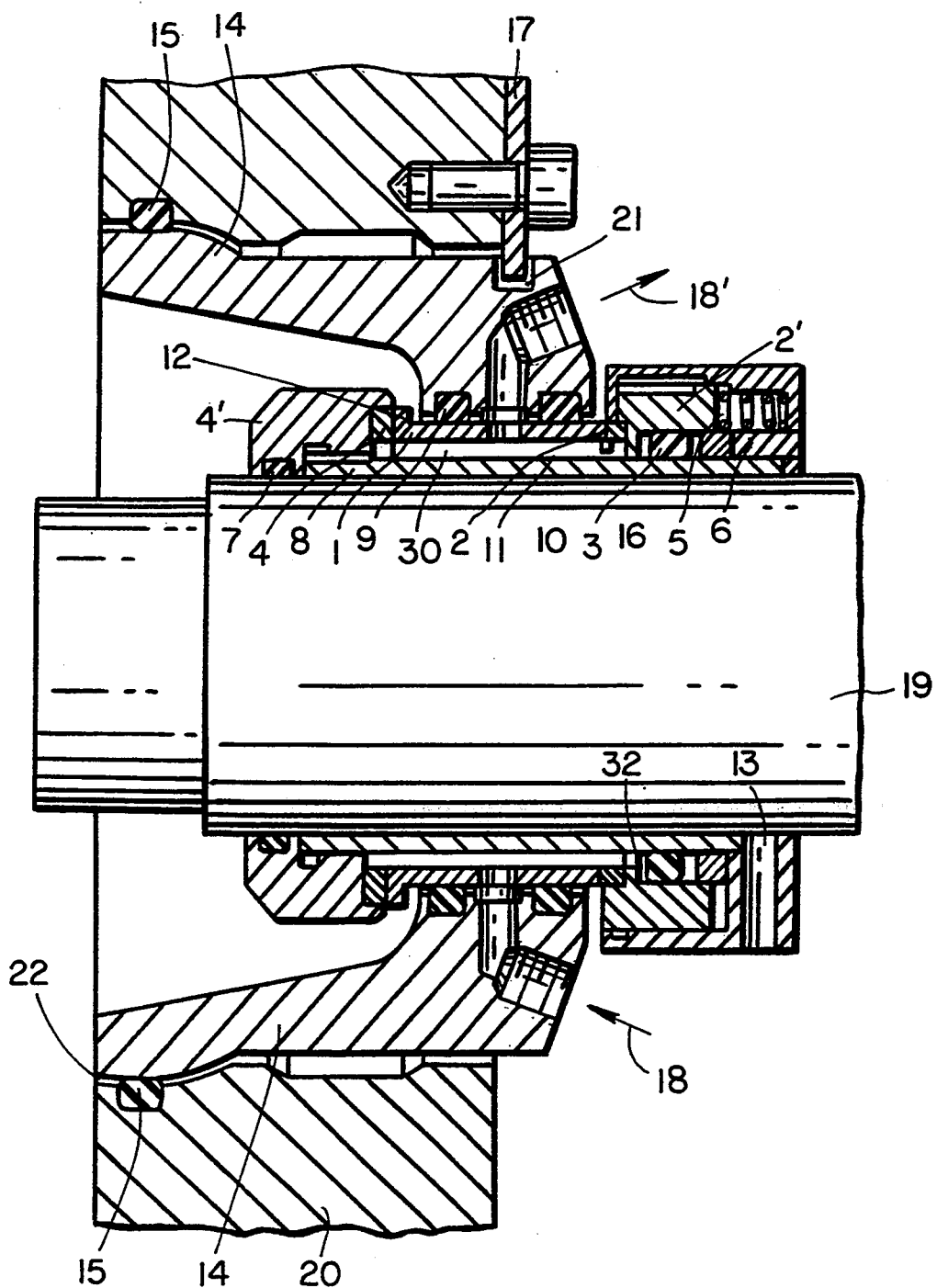

United States Patent [19]
Anderberg

[11] Patent Number: 5,351,972
[45] Date of Patent: Oct. 4, 1994

[54] INSIDE/OUTSIDE MOUNTED DOUBLE MECHANICAL FACE SEAL

[76] Inventor: Göran Anderberg, Strandvägen 303, S-261 61 Landskrona, Sweden

[21] Appl. No.: 923,911

[22] PCT Filed: Mar. 13, 1991

[86] PCT No.: PCT/SE91/00187
§ 371 Date: Aug. 28, 1992
§ 102(e) Date: Aug. 28, 1992

[87] PCT Pub. No.: WO91/14118
PCT Pub. Date: Sep. 19, 1991

[30] Foreign Application Priority Data
Mar. 15, 1990 [SE] Sweden .............. 9000919-2

[51] Int. Cl.$^5$ .................................. F16J 15/34
[52] U.S. Cl. .......................... 277/59; 277/65; 277/81 R; 277/100
[58] Field of Search ............ 277/3, 15, 30, 59, 61-63, 277/65, 74, 81 R, 86, 88, 100, 136

[56] References Cited

U.S. PATENT DOCUMENTS

| | | | |
|---|---|---|---|
| 246,185 | 8/1881 | Monroe | 277/100 X |
| 2,677,328 | 5/1954 | Vitek | 277/65 X |
| 2,836,440 | 5/1958 | Brumagim | 277/62 |
| 3,162,456 | 12/1964 | Williams | 277/136 |
| 3,181,874 | 5/1965 | Conklin | 277/86 |
| 3,661,398 | 5/1972 | Hummer | 277/74 |
| 4,169,603 | 10/1979 | Funk | 277/59 |
| 4,294,454 | 10/1981 | Cannings | 277/65 |
| 4,357,026 | 11/1982 | Panchetti | 277/65 X |
| 4,377,920 | 3/1983 | Netzel | 277/65 X |
| 4,466,619 | 8/1984 | Adams | 277/59 X |
| 4,538,821 | 9/1985 | Wallace | 277/81 R |
| 5,203,575 | 4/1993 | Azibert et al. | 277/81 R X |
| 5,213,340 | 5/1993 | Azibert et al. | 277/935 D X |

FOREIGN PATENT DOCUMENTS

| | | | |
|---|---|---|---|
| 2042072 | 3/1972 | Fed. Rep. of Germany . | |
| 3544872 | 7/1986 | Fed. Rep. of Germany . | |
| 194171 | 11/1984 | Japan | 277/74 |
| 270579 | 10/1961 | Netherlands | 277/74 |

OTHER PUBLICATIONS

H. Hugo Buchter; "Industrial Sealing Technology"; Jul. 1986; pp. 141, 143-146, 148-149.

*Primary Examiner*—William A. Cuchlinski, Jr.
*Assistant Examiner*—Scott W. Cummings
*Attorney, Agent, or Firm*—Ladas & Parry

[57] ABSTRACT

The present invention consists of a shaft packing with an inner seal (4) and an outer seal (2) which are biased by means of springs (5) and an intermediate ring (1). The spring package and the major part of the shaft packing are positioned on the outside of a wall (20) of a container or the like, on the inside of which container an aggressive medium may be found. On the inside of the wall and in contact with the medium there are only a counter ring (4'), the inner seal (4), the intermediate ring (1) and a mounting (14). All these parts have smooth surfaces without grooves, notches or the like in order to avoid that the possibly aggressive medium accumulates on the shaft packing. The shaft (19) is journalled in the wall (20) by the mounting (14), and the contact surfaces (22) between the mounting (14) and the wall (20) have arcuate cross-sections. The mounting (14) is prevented from rotating by means of a washer (17) secured to the wall (20) and lowered into a groove (21) on the outer surface of the mounting (14). A flushing space is defined between a sleeve (8) fixed on the shaft, the inner sleeve (4'), the inner seal (4), the intermediate ring (1), the outer seal (2) and the outer sleeve (2') for lubrication of the inner and outer seals (2, 4) and their sliding surfaces. The flushing is also intended to remove particles possibly detached by the rotation of the shaft.

13 Claims, 2 Drawing Sheets

INSIDE/OUTSIDE MOUNTED DOUBLE MECHANICAL FACE SEAL

The present invention relates to a shaft packing for sealing of rotating machine parts in order to prevent penetration by a medium in a container or the like.

At lead-through shafts in e.g. pumps and mixers the rotating shaft must be sealed against the stationary portion, e.g. the pump housing, in order to prevent that fluid penetrates at the transition between the rotating and stationary portions.

For the shaft packings of this type existing today most often a large part of the packing, including the spring package biasing the packing, is present in the container to be sealed.

This leads to it being a great risk by the packings of today that fluid penetrates from behind the packing, into the spring unit and all corners of the packing. Within food industry this is a severe problem, as colonies of bacteria rapidly are formed in the packing.

Within the cellulose industry, fibrous liquid can penetrate into the spring unit, whereby depositions are built up on the springs. The elasticity is decreased or lost and the packing starts to leak.

In order to eliminate the above defects double packings are arranged with a flushing between the packings. In this respect springs and the components of the packing have been present in the flushed space.

From aseptic viewpoint this space is adjacent the product only separated by the sealing surfaces, which is unsatisfying as a possible growth of bacteria in the flushed space may "migrate" through the sealing surface to the product.

Likewise, the flushing medium is often contaminated and limy which means that coatings are formed on the springs, eventually restraining their movements.

Yet another problem is that one does not always have control over the sealing. The wear and tear of the slide rings must be taken up by the elastic portion of the sealing, and wedge sealings wear and tear on the shaft by the wedge portion constitutes an additional uncontrollable factor.

Still another problem with the shaft packings of today is that it is difficult to axially fix the packing in the right position and that they can be difficult to reach in order to tighten the stop screws in the rear edge of the packing if it is built in, e.g. a stuffing box space.

In order to lubricate the packing and to take away small particles that are detached during the rotation it is common to arrange a flushing of the shaft packing.

An object with the present invention is to provide a shaft packing which is totally encased and moreover has a smooth and hygienic surface both on the product side and in the flushed space. Whereby there are no pockets or the like collecting the sealed medium.

A further object with the present invention is to provide a shaft packing in which angular variations of the shaft do not lead to wear and tear of the shaft packing, because the angular variations are taken up by a non-rotating part.

Still another object with the present invention is to provide flushing of the shaft packing in order to lubricate the sealing surfaces and to flush away possible contaminants. In one embodiment of the invention it is not necessary that the pressure of the flushing is higher than the pressure of the container to be sealed. The hydraulic balancing of the sealing surfaces is so formed that the sealing surfaces will receive a positive closing action from the pressure of the flushing and the pressure of the product, respectively, in spite of their mutual pressure relation.

These objects are achieved by a shaft packing according to the claims. Which shaft packing comprises a double sealing with an outer and an inner sealing that are biased to an intermediate ring by means of a spring package. The spring package is placed on the outside of both the medium to be sealed off and the flushing space, whereby there is no risk that the medium from the container, which in the food industry often contains particles and fibres, comes into contact with the spring package and thereby disturb its function or form growth of bacteria. Thus, it is possible to design the flushed space with completely smooth surfaces which means that particles and fibres cannot stick. This is specially important within food production as a risk of growth of bacteria is not allowed in the area closest to the sealing surfaces to the product.

Thus, from the side of the medium there are no gaps, cavities or other spaces where media can penetrate and accumulate in dirt pockets, that can be hard to clean.

Figure 2:
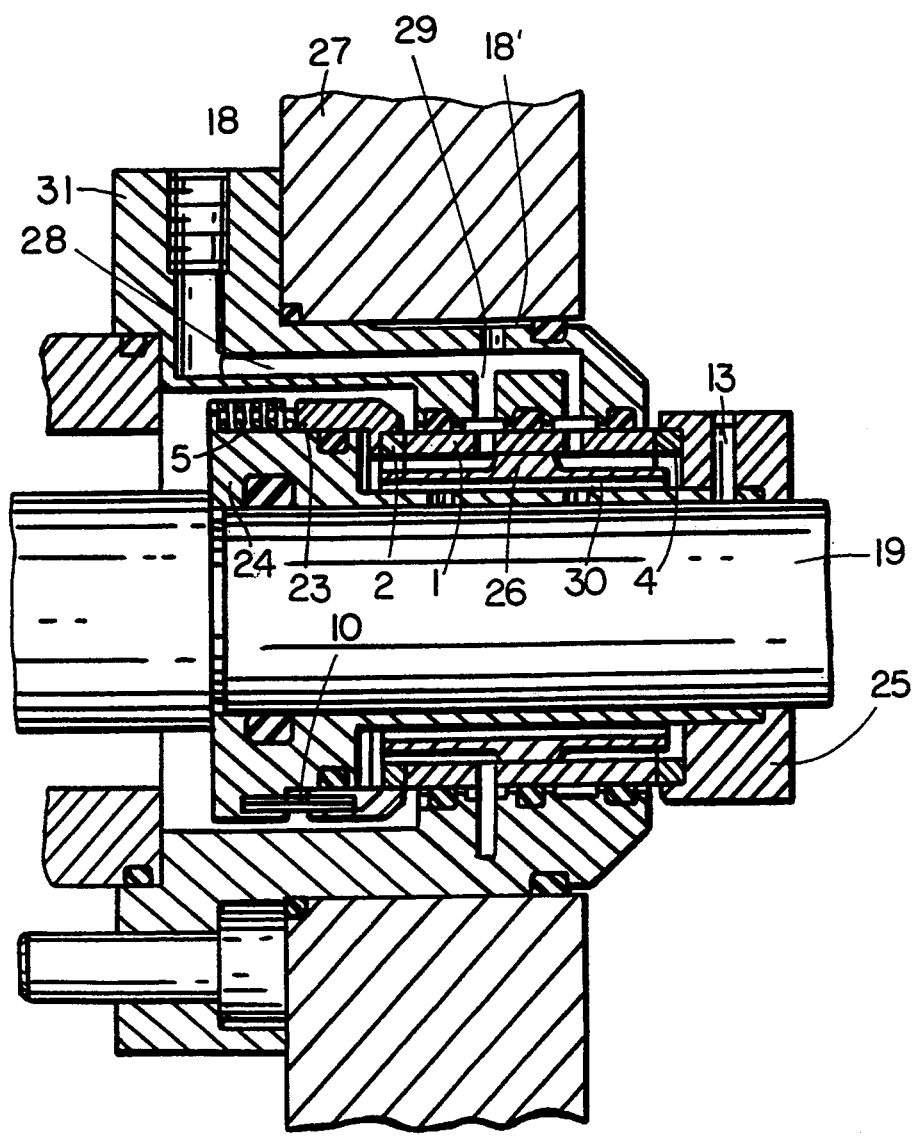

Additional advantages and objects with the present invention appear from the following, detailed specification with reference to the drawings, in which:

FIG. 1 is a cross-sectional view of a first embodiment of the present invention, and FIG. 2 is a cross-sectional view of a second embodiment of the present invention.

Both the embodiments shown are to be seen as examples only that can be varied and combined to new forms within the scope of the invention, as defined by the enclosed claims.

Referring to FIG. 1 a rotating shaft 19 is shown, on which a shaft packing is arranged. The shaft packing being of the double seal type comprises an inner seal 4 and an outer seal 2 and a number of additional seals 3, 7, 9 and a spacer ring 16. Double seal type here means two seals with a flushing medium between the seals. The inner seal 4, being the seal that primary seals off the medium of a container, sits in an inner counter ring 4' attached to the shaft 19, while the outer seal 2 sits in an outer retaining ring 6, outside the wall 20 of the container to be sealed. The retaining ring 16 has a sleeve 2' which by means of a number of springs 5 presses the outer seal 2 against an intermediate ring 1 which in turn presses the inner seal 4 against the inner counter ring 4'. The number of springs is determined in relation to the surface pressure that is to be achieved on the sealing surfaces.

The retaining ring 6 is fixed to the shaft 19 by means of a number of set screws 13. To guarantee the rotation of the outer sleeve 2' a cylindric pin 10 is arranged in a circular groove being arranged to the half in the retaining ring 6 and to the half in the inner sleeve 2'. A locking wire 11 is arranged to hold the cylindric pin 10.

A flush inlet 18 leads to a space 30 between the inner and outer seals 2, 4, the intermediate ring 1 and a sleeve 8 fixed on the shaft 19, and a flush outlet 18' leads from the flushing space 30.

It is almost impossible to avoid a certain angular variation between the shaft 19 and the wall 20, and by large, welded constructions it is extremely difficult to get an exact adjustment. In order to take up this angular variation and possible irregularities of the shaft 19, or of its rotation, the shaft 19 is journalled in the wall 20 by means of a special mounting 14. The mounting 14 is not rotating with the shaft but is journalled with arcuate surfaces in the wall 20, seen in cross-section. As the mounting 14 is not rotating one avoids the common problem where an angular variation contributes to a wear and tear of the important sealing for each round the shaft 19 rotates.

In order to take up the angular variations of the shaft 19, and possible further irregularites, the shaft 19 is arranged in the special mounting 14 in the container wall 20. The bearing surfaces 22 of the mounting 14 and the wall 20 in contact with each other have an arcuate cross-section. Furthermore, a seal 15 is arranged at this bearing. In order to prevent the mounting 14 from rotating a washer 17, screwed to the wall 20, is arranged in a groove 21 in the mantle surface of the mounting 14.

The parts that accompany in the rotation of the shaft are the counter ring 4' with the inner seal 4, the shaft sleeve 8 and the retaining ring 6 with the outer ring 2', the outer seal 2 and the springs 5. The intermediate ring 1, on the other hand, does not accompany the rotation of the shaft 19.

In order not to risk accumulation of aggressive medium it is a demand within the food industry, pharmaceutical industry and cellulose industry that the part of the shaft packing being in contact with the medium in the container to be sealed off shall be as smooth as possible. Therefore no pockets, grooves or the like are allowed. By the shaft packings of today it is common that the medium of the container exists radially inside the inner seal and thereby comes in contact with the inner periphery of it. However, for the present shaft packing the medium exists outside the outer periphery of the inner seal 4, whereby the centrifugal force by the rotation of the shaft assists in preventing penetration as the medium will receive a component force directed away from the seal 4. The inner of the shaft packing as well should be as smooth as possible in order to prevent accumulation of material.

Irrespective of the pressure being the highest in the container or the flushing space 30 it will result in a component force directed leftwardly on the intermediate ring 1, as seen in the Figure. This leads to the inner seal 4 being pressed against the counter ring 4' by the intermediate ring 1. The resulting pressure in the container acts on the vertical surface 12 of the intermediate ring 1 which will give the component force directed leftwardly. As for the pressure of the flushing space the resulting force will be received by the inner vertical pressure area 32 of the outer sleeve 2'. As mentioned above, the location of the inner seal 4, due to the centrifugal force, contributes as well to counteract penetration and accumulation of medium on the packing.

At the inside of the wall 20 the counter ring 4', the inner seal 4 and a part of the intermediate ring 1 are in contact with the medium of the container. Also the inner portion of the mounting 14 is in contact with the medium of the container. All these parts have smooth surfaces without grooves, notches, pockets or the like, which means that it is impossible for the medium of the container to accumulate on the shaft packing.

For the purpose of lubricating the inner and outer sealings 2, 4 and their sliding surfaces, the inner portions of the packing is flushed with a suitable flushing medium. Furthermore, this flushing has the purpose of removing small particles possibly detached during the rotation of the shaft 19.

In the alternative embodiment according to FIG. 2 the flushing medium is guided in such a manner that it is certain to pass both the seals, which is to be further described below.

In the alternative embodiment according to FIG. 2 parts corresponding to parts in FIG. 1 have corresponding reference numerals.

This second embodiment can be used for an agitator which is placed on a cover or top 27 of a container of particular importance with this embodiment is that the movement of the flushing medium is guided across the area directly under the sealing surfaces and thereby can easily remove possible particles. There is an inner sleeve 25 which also is a counter ring for the force of the springs 5 which by an intermediate ring 1 on the inner seal 4. Here as well there are a number of additional seals and sleeves 23, 24, 31, which together form a compact shaft packing with comparatively clean, smooth surfaces.

In order to guide the flushing medium a guide ring 26 is positioned in the flushing space 30 between the intermediate ring 1 and the sleeve 24 fixed on the shaft. The flushing medium passes from the inlet 18 by the conduit 28 through the intermediate ring 1 and past the inner seal 4, from there the flushing medium passes under the guide ring 26 past the outer seal 2 and by the conduit 29 to the outlet 18'. Due to this flushing arrangement it is certain that the flushing medium passes both the seals 2, 4.

I claim:

1. An inside/outside mounted double mechanical face seal for sealing a moving shaft extending through a stationary wall of a container having an interior in which a medium to be sealed is contained, comprising:
    an inner seal arranged in a counter ring on the inside of the wall;
    an outer seal arranged on the outside of the wall;
    an intermediate ring extending between the inner and outer seals and through the wall; and
    springs arranged on the outside of the wall and outside the outer seal;
    wherein the inner and outer seals are biased to the intermediate ring by means of the springs.

2. A seal according to claim 1, further comprising a sleeve fixed on the shaft, whereby a space for a flushing medium is defined between the sleeve, the intermediate ring and the outer and inner seals.

3. A seal according to claim 2, further comprising:
    a retaining ring fixed on the shaft, said retaining ring accommodating the springs and the outer seal;
    an outer ring located outside the outer seal in the interior of the retaining ring, between the outer seal and the springs, said retaining ring and outer ring rotating with the shaft.

4. A seal according to claim 3, wherein the pressure of the medium in the container and the pressure of the flushing medium in the flushing space both act to press the inner seal against the counter ring, by means of a vertical surface on the upper side of the intermediate ring inside the container and a vertical surface at the interior of the outer ring, respectively.

5. A seal according to claim 3, wherein the only parts of the seal inside the wall and in contact with the medium in the container are the inner seal, the counter ring and a part of the intermediate ring.

6. A seal according to claim 5, wherein the parts in contact with the medium in the container have smooth surfaces without any grooves or notches.

7. A seal according to claim 6, further comprising a mounting for holding the seal in a hole in the wall and providing contact surfaces between the seal and the wall, said contact surfaces being arcuate and the mounting being prevented from rotation by a washer secured to the wall and located in a groove in the mounting.

8. A seal according to claim 2, further comprising a guide ring arranged in the flushing space for directing the flushing medium through the intermediate ring, past the inner sealing, under the guide ring, past the outer sealing and out through the intermediate ring.

9. A seal according to claim 1, further comprising a mounting for holding the seal in a hole in the wall and providing contact surfaces between the seal and the wall, said contact surfaces being arcuate and the mounting being prevented from rotation by a washer secured to the wall and in a groove in the mounting.

10. An inside/outside mounted double mechanical face seal for sealing a moving shaft extending through a stationary wall of a container having an interior in which a medium to be sealed is contained, comprising:
   an inner seal arranged in a counter ring on the inside of the wall;
   an outer seal arranged on the outside of the wall;
   an intermediate ring extending between the inner and outer seal and through the wall;
   springs arranged on the outside of the wall and outside the outer seal, the inner and outer seals being biased to the intermediate ring by means of the springs;
   a retaining ring fixed to the shaft, said retaining ring accommodating the springs and the outer seal;
   an outer ring located outside the outer seal in the interior of the retaining ring, between the outer seal and the springs, the outer ring being fixed to the retaining ring by means of a cylinder pin positioned in a groove in both the outer ring and the retaining ring.

11. A seal according to claim 10, wherein the retaining ring is fixed to the shaft by means of one or more set screws.

12. A seal according to claim 11, further comprising a sleeve fixed on the shaft, whereby a space for a flushing medium is defined between the sleeve, the intermediate ring and the outer and inner seals.

13. A seal according to claim 12, further comprising a guide ring arranged in the flushing space for directing the flushing medium through the intermediate ring, past the inner sealing, under the guide ring, past the outer sealing and out through the intermediate ring.

* * * * *